No. 879,647. PATENTED FEB. 18, 1908.
W. M. JONES.
COTTON CHOPPER.
APPLICATION FILED JUNE 25, 1907.
2 SHEETS—SHEET 1.
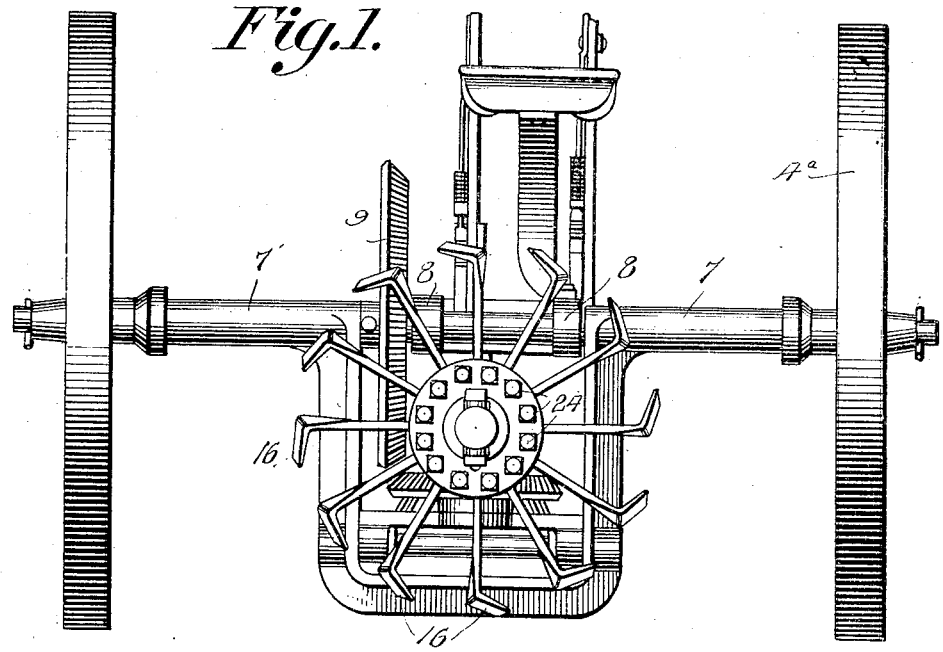
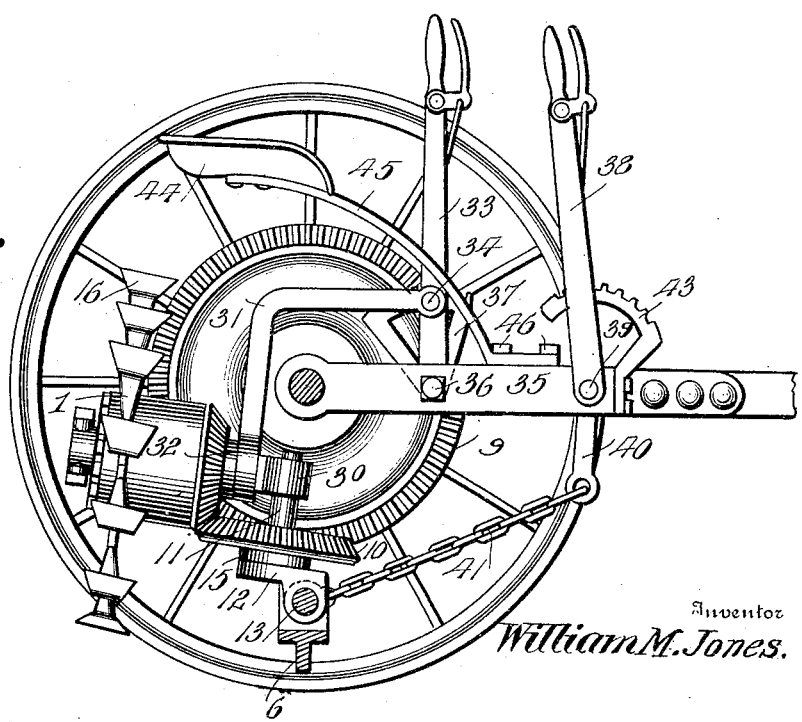
Inventor
William M. Jones.
Witnesses
By Victor J. Evans
Attorney No. 879,647. PATENTED FEB. 18, 1908.
W. M. JONES.
COTTON CHOPPER.
APPLICATION FILED JUNE 25, 1907.
2 SHEETS—SHEET 2.
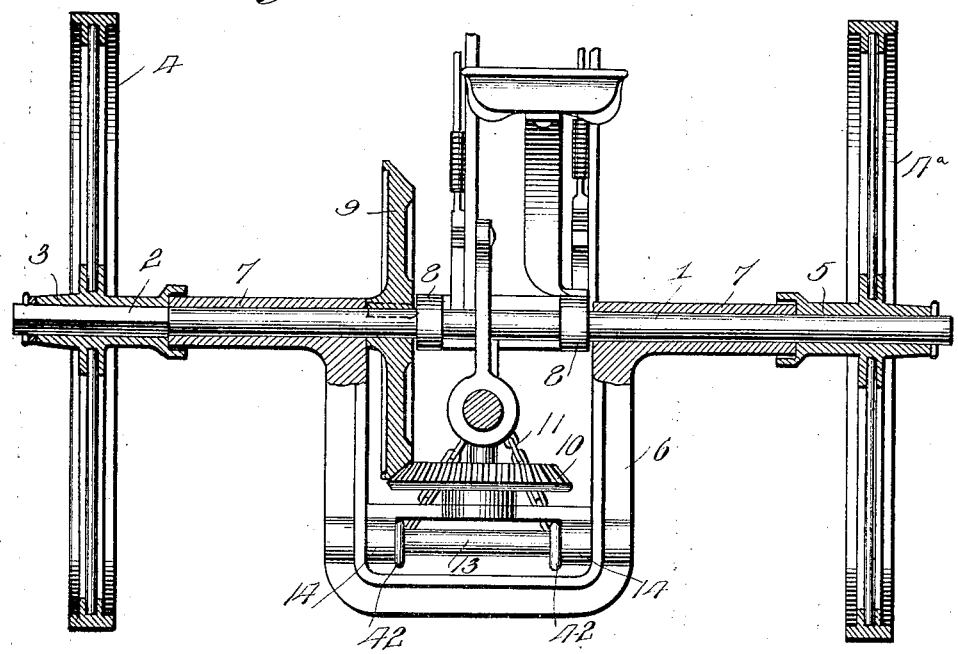
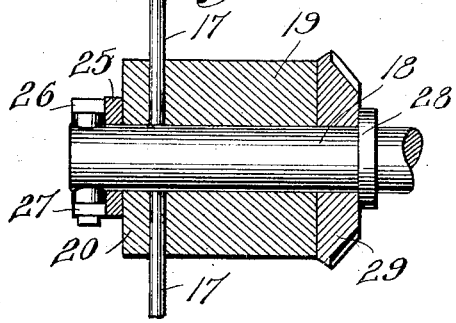
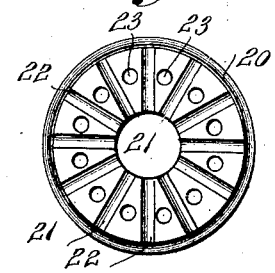

UNITED STATES PATENT OFFICE.

WILLIAM M. JONES, OF CROSS PLAINS, TEXAS.

COTTON-CHOPPER.

No. 879,647.

Specification of Letters Patent.

Patented Feb. 18, 1908.

Application filed June 25, 1907. Serial No. 380,892.

*To all whom it may concern:*

Be it known that I, WILLIAM M. JONES, a citizen of the United States of America, residing at Cross Plains, in the county of Callahan and State of Texas, have invented new and useful Improvements in Cotton-Choppers, of which the following is a specification.

This invention relates to cotton choppers, and the principal object of the invention is to simplify the construction and to provide a compact, strong, durable and efficient machine.

Another object of the invention is to provide improved means for clamping the hoes in place upon a shaft which is rotated by connections from one of the ground wheels.

These and other objects may be attained by means of the construction illustrated in the accompanying drawings, in which:

Figure 1 is a rear elevation of a cotton chopper made in accordance with my invention. Fig. 2 is a vertical section through the axle and showing the operative mechanism of the chopper in side elevation. Fig. 3 is a transverse vertical section taken in line with the axle. Fig. 4 is a detail sectional view of the rotating hoe shaft, and showing the manner of clamping the hoe shanks in place. Fig. 5 is a face view of the clamp plate for holding the choppers in place.

Referring to the drawings for a more particular description of my invention, the numeral 1 designates the axle provided with a squared end 2 which fits a hub 3 of one of the wheels 4 so that said wheel will rotate the axle 1. The wheel 4ª is provided with a hub 5 which is mounted to rotate freely upon the axle 1. Depending from the axle 1 is a yoke 6 having horizontal sleeves 7 through which the axle 1 passes and freely rotates therein. Stop rings 8 on the axle prevent lateral movement of the axle relatively to the yoke. Keyed to the axle 1 is a large bevel gear wheel 9 which meshes with a bevel pinion 10 mounted to rotate upon a stub shaft 11 rising from a bracket 12 supported upon a shaft 13 mounted in bearings 14 on the yoke 6. The bracket 12 is provided with a washer 15 underneath the pinion 10.

The hoes 16 are each provided with a round shank 17, and said shanks are mounted upon a shaft 18 by means of a sleeve 19 and a clamp 20, said clamp being in the form of a disk having a central opening 21 for the shaft 18 and a series of radial grooves 22 in which the shanks 17 are fitted, and a series of bolt holes 23 through which bolts 24 extend, said bolts being seated in threaded sockets in the sleeve 19. The sleeve 19 may also be provided with grooves similar to those designated 22 in the clamp 20. A washer 25 is fitted to the shaft 18 and a bolt 26 passes through the shaft 18, and is provided with a nut 27 to hold the washer in place against the clamp plate 20. Fitted against the stop collar 28 on the shaft 18 is a bevel pinion 29 which meshes with the bevel pinion 10. The end of the shaft 18 is provided with a loop 30 through which the upper end of the stub shaft 11 extends. An angular arm 31 is provided with a ring 32 which surrounds the shaft 18 adjacent to the stop ring 28 and pivotally connected to the upper end of the arm 31 is a lever 33, said lever being pivoted at 34, and said lever being pivoted to the draft tongue 35 by means of the bolt 36 which passes through said draft tongue and supports a rack or sector 37 for holding said lever 33 in adjusted positions. A lever 38 pivoted at 39 to the tongue 35 has a depending arm 40 to which is connected chains 41 which extend backward and are connected to rings 42 on the shaft 18. A rack 43 bolted to the tongue is provided with teeth for locking the lever 38 in any adjusted position. A seat 44 is connected to a curved supporting bar 45 bolted at 46 to the tongue.

The operation of my invention may be briefly described as follows: As the machine is drawn over the field, the wheel 4 rotates the axle 1, and the large bevel gear wheel 9 is rotated and meshes with the pinion 10. The pinion 29 meshes with the pinion 10 and rotates the hoes. When it is required to throw the hoe shaft out of engagement with the pinion 10, the lever 33 is thrown to the front, and the lever 38 may be thrown to the rear to hold the pinion 10 out of engagement with the pinion 29.

From the foregoing it will be obvious that a machine made in accordance with my invention is compact in form, is simple in construction, the rotation of the hoe shaft is direct and that the machine as a whole is strong, durable and efficient.

Having thus described the invention, what I claim is:

1. A cotton chopper comprising an axle, a wheel fitted to one end of said axle to rotate the same, and a wheel loosely mounted to rotate upon the opposite end of the axle, a yoke mounted on the axle, and a large bevel gear connected to the axle, an idler pinion in mesh with said bevel gear, a chopper shaft having a bevel pinion in mesh with said idler pinion, hoes provided with rounded shanks; and means for clamping said hoes radially upon a shaft.

2. In a cotton chopper, the combination of an axle, a wheel connected to said axle for rotating the same, a bevel gear on said axle, an idler pinion mounted upon a stub shaft connected to a bracket, a yoke, a chopper shaft having a ring which engages said stub shaft, an angle arm connected to said shaft, a lever connected to said angle arm, a lever pivoted to the tongue of the machine, chains connected to said lever and connected to rings mounted upon a shaft in said yoke.

In testimony whereof, I affix my signature in presence of two witnesses.

WILLIAM M. JONES.

Witnesses:
R. R. BOND,
SAM H. CARSON.